Patented Dec. 25, 1928.

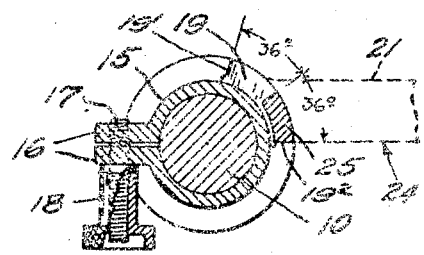

1,696,525

UNITED STATES PATENT OFFICE.

LEIGH H. COOLIDGE, OF SEATTLE, WASHINGTON.

PROPELLER-BLADE-MEASURING INSTRUMENT.

Application filed December 9, 1925. Serial No. 74,259.

This invention relates to an instrument for measuring helical surfaces and, more especially, the surfaces of propeller blades for the purpose of ascertaining the helical pitch thereof.

The object of the invention, generally, is to provide an instrument of this character which is adapted to be conveniently employed to accurately and expeditiously measure surfaces of this character.

Another object of the invention is to provide a construction wherein the measuring devices are so proportioned and arranged that the helical pitch or pitches are afforded by a direct reading of a scale provided upon the instrument itself without the necessity of performing any arithmetical or geometrical calculation.

More specific objects and advantages of the invention will appear in the following description.

The invention consists in the novel construction, adaptation and combination of parts hereinafter described and claimed.

In the accompanying drawing,—

Figure 1 is a front elevation of an instrument embodying my invention shown applied to a propeller, parts of the devices for securing the instrument to the propeller and a portion of the latter being in section. Fig. 2 is a horizontal section taken on the line 2—2 of Fig. 1. Fig. 3 is a vertical section taken through the carriage and the beam, with the slide shown in side elevation. Fig. 4 is a vertical section taken substantially on line 4—4 of Fig. 5. Fig. 5 is a horizontal section on line 5—5 of Fig. 1. Fig. 6 is a front elevation illustrating parts of the invention shown in Fig. 1 to a larger scale.

In said drawing, the reference numeral 10 represents a cylindrical post provided with a rigid collar 11 of a conoidal shape, and a screw threaded stem 12 in axial alignment with each other.

Mounted for axial adjustment upon said stem is a second conoidal collar 13, and a clamping nut 14 which is threaded upon the stem.

The conoidal collars 11 and 13 are arranged, as shown in Fig. 1, with their smaller ends in opposed relation with each other so that they may enter the ends of the bore A of a propeller hub H for the purpose of centering the stem in such bore and cooperate with the threaded stem and the clamping nut to couple the post 10 with the propeller in axial alignment with each other.

Mounted upon said post for vertical and rotary movements is a clamp collar 15 provided with apertured ears 16 for a screw bolt 17 which is secured in the aperture of one of said ears and extends through the aperture of the other ear to receive a nut 18 whereby the collar 15 is rigidly clamped to the post in a selected position.

In its upper portion said clamp collar is provided with a peripheral groove 19 (Fig. 2) of a predetermined arcuate length circumferentially of the collar. Fitted for rotative movement to the post 10 and supported by said clamp collar is a sleeve 20, constituting the hub of a horizontal arm or beam 21. Said beam is provided in its front face with a recess 22 (Fig. 3) disposed between two parallel ribs 23 extending longitudinally of the beam and having front surfaces 24 in a plane radially of said post.

The extent of the revoluble movement, however, of the beam with respect to the clamp collar 15 is limited, preferably to thirty-six degrees circular measure, that is to say, to one-tenth of a complete revolution. To effect such relatively limited movement, the beam hub 20 is provided with a depending lug 25 which is arranged to extend into the collar groove 19, said lug being of an arcuate length less than that of the groove just sufficient to permit such horizontal vibratory movement of the beam.

Positioned within the recess 22 of the beam 21 and movable longitudinally thereof is a carriage 26 having along its upper and lower edges ribs 27 which track in guideways 28 of the beam. Said carriage is secured in adjusted positions to the beam by suitable means, the means shown comprising brake blocks 29 operating in slots 30 of the carriage and yieldingly held in engagement with the beam by attaching the blocks to a bow-shaped resilient spreader 31. To disengage said blocks from the beam, said spreader is flexed as by means of a manually actuated headed bolt 32 slidably mounted in a boss 33 of the carriage.

Rigid with said carriage and constituting a part thereof is a vertically disposed guide box 34, preferably of rectangular shape in horizontal section (Fig. 5), said guide box being provided in its front, for its entire length with a central slot 35.

The inner surface 36 of back wall of said guide box is disposed in a plane with the front surfaces 24 of the beam ribs 23.

Fitted within the guide box 34 for vertical movement is a hollow bar 37 having, throughout its length at its front, a rib 38 of a substantially T-shape in horizontal section, said rib extending lengthwise through the slot 35 of the guide box. Socketed in the lower end of the bar 37 is an extension 39 terminating in a point 40.

The point 40 and the back surface 41 of the bar 37 are at all times retained by the guide box 34 in a vertical plane coextensive with the plane of the front surfaces 24 of the beam ribs and therefore in a plane coincident with the axis of the beam's revolution. The above mentioned bar 37 with its rib 38 and the extension 39 will, as a whole, be hereinafter designated as the slide and is designated in its entirety by the letter S.

Provided within the slot 35 of the guide box 34 and mounted upon the T-shaped rib 38 of said slide is a block 42 hereinafter termed the runner.

Said runner is fitted to the rib 8 to afford frictional engagement therewith sufficient to cause the runner to be moved up and down in unison with the slide as the latter is moved vertically in the guide box; yet permitting the runner to be moved with respect to the slide for the purpose of adjustment as will be presently explained.

As best illustrated in Fig. 6, on the front of the guide box 34 at opposite sides of the slot 35 are produced scales 43 and 44 which, in this instance, read in tenths of inches, the scale 43 at one side of said slot commencing at a zero mark 0 (Fig. 1) near the upper end of the guide box, and the scale 44 at the other side commencing near the upper end of the guide box with a predetermined mark, as "60" for example, included in the scale 43 near its lower end.

The runner is provided with an index mark 45 extending transversely thereacross and in association therewith, at each side of the runner is a vernier 46 for cooperating with the aforesaid scales for taking off subdivisional measurements from the latter in an obvious manner.

In the operation of my improved measuring instrument, the standard or post member 10 is secured to the hub of a propeller as hereinbefore described. The clamp collar 15 is then temporarily located to hold the beam 21 at a short distance above a propeller which is to be tested or measured. The beam is then swung horizontally to carry the slide S to positions upon the surface $B^1$ of a propeller blade, as B, in proximity to the opposite sides of the blade. In thus swinging the beam from side to side the beam lug 25 encounters the end walls $19^1$ and $19^2$ (Fig. 2) of the groove 19 of the clamp collar to adjust the same into a suitable rotary position, whereupon the clamp collar is rigidly secured by means of the bolt 17 and nut 18 to the post 10.

The carriage 26 carrying the slide S, is then shifted lengthwise of the beam 21 to position the slide at a selected distance radially from the hub axis, which distance is conveniently found by means of an indicating mark 47 on the carriage registering with a desired denominating mark of a scale 48 which is readable in inches and fractions thereof, provided on the beam 21.

The operator now takes hold of the slide S with one hand and the beam 21 with his other hand and thereby moves the slide and beam vertically and horizontally, respectively, to cause the point 40 of the slide to contact with a place, as at $x$, for example, on the high side of the propeller blade as determined by the beam lug 25 encountering the groove wall $19^1$ of the clamp collar 15. Thus arranged, the slide is by one of the operator's hands held firmly against the blade and with his other hand he elevates the runner 42 until the index mark 45 thereon is brought to the zero mark 0 of the scale 43. The beam is then swung to carry the lug 25 thereof against the wall $19^2$ at the other end of the collar groove 19 and, where the beam is thus stopped, the operator lowers the slide until the point thereof contacts with the blade, as at $x^2$. It is to be understood that the runner 42 is carried down with the slide, consequently the index mark, or a vernier on the runner will indicate by a direct reading with respect to the carriage scale 43 the vertical movement of the slide at the extremities of an arc of 36°, hence the scale of tenths will provide the actual length of pitch of the blade B at the circumference of a circle whose radius is the distance, denoted on the beam scale 48, of the slide point 40 from its axis of revolution—that is from the center of the propeller. This function of the instrument may be expressed as follows: As 36°, the revoluble movement of the point 40, is to 360° in a circle; so is the reading upon the scale 43, in tenths of inches, to the helical pitch in actual inches.

In the event that the length of the scale 43 is insufficient to accommodate the difference in the heights of the runner for complementary measures of the blade, the second scale 44 is usuable supplementary to the first scale 43 in the following described manner, to wit: When the runner's index mark meets a mark, as M, located near the lower end of the scale 43, the slide is held in its then lowered position by the operator while the operator moves the runner upwardly upon the slide until its index mark coincides with a mark, as M¹ on the scale 44 having a denomination, as "60" for example, which will correspond with the mark denoted by M on scale 43. Being thus stepped up, so to speak, the runner is again lowered with the slide until both are stopped by the slide point coming into contact with the blade, the total distance which the slide makes in its successive downward movements being indicated by the runner with respect to the scale 44. The use of two supplementary scales, however, is for compactness only, as a continuous scale will answer the same purpose and may even prove more expeditious and convenient where the instrument is confined for use in a single shop.

The operation above described is repeated any number of times for each blade of a propeller, although it is essential to rotatively move the clamp collar 15 for conveying the beam and the slide into operative relations with respect to the successive blades.

While I have illustrated and described my invention as applied to a screw propeller, I do not wish to be understood as limiting the invention to such use only, inasmuch as it may be employed for measuring other devices, for example, the helical blade of a screw-conveyor. Furthermore I do not confine myself to the specific construction shown except as limited by the scope of the following claim.

What I claim, is,—

In an instrument for measuring the pitch of a propeller blade, the combination with a post adapted to be secured axially to a propeller hub, a beam connected to said post for a predetermined arcuate movement, said beam being provided in its front face with a recess between two ridges disposed longitudinally of the beam, a carriage positioned in the recess of said beam and connected to the latter for movement radial of said post, a spring actuated clutch comprising two brake blocks engageable with the ribs of said beam for securing said carriage at selected positions to said beam, and a slide mounted in the carriage for movement at right angles to said beam, said carriage being provided with a scale of marks, and a runner slidably connected to said slide for movement at right angles to said beam with and independently of the slide, said runner being provided with a mark adapted to be used in cooperation with the scale marks on the carriage for regulating the relative positions of the slide with respect to the carriage.

Signed at Seattle, Washington, this 3rd day of November 1925.

LEIGH H. COOLIDGE.